United States Patent [19]

Jin

[11] 3,904,570
[45] Sept. 9, 1975

[54] FLAME-RETARDANT BINDER COMPRISING VINYLIDENE HALIDE-BIS(HYDROCARBYL) VINYL PHOSPHONATE POLYMER LATICES BLENDED WITH ANTIMONY OXIDE

[75] Inventor: Jung Il Jin, Irvington, N.Y.

[73] Assignee: Stauffer Chemical Company, Westport, Conn.

[22] Filed: Sept. 19, 1973

[21] Appl. No.: 398,624

[52] U.S. Cl. ........... 260/29.6 TA; 260/8; 260/17 A; 260/17 R; 260/29.6 M; 260/29.6 MM; 260/29.6 MP; 260/29.6 T; 260/29.7 T; 260/29.7 M; 260/29.7 GP; 260/42.55; 260/884; 260/885; 260/899; 260/901; 260/80.71; 117/161 UT
[51] Int. Cl.² ......................................... C08L 23/00
[58] Field of Search ................. 260/29.6 T, 29.6 TA, 260/29.6 MM, 29.6 MP

[56] References Cited
UNITED STATES PATENTS

| | | | |
|---|---|---|---|
| 3,300,423 | 1/1967 | Brown et al. | 260/29.6 MP |
| 3,428,480 | 2/1969 | Wagner et al. | 260/29.6 MP X |
| 3,489,706 | 1/1970 | Mikofalvy | 260/29.6 T |
| 3,725,359 | 4/1973 | Goswami et al. | 260/29.6 T X |

*Primary Examiner*—Lucille M. Phynes

[57] ABSTRACT

Polymer latices comprising at least one halogen-containing $\alpha,\beta$-ethylenically unsaturated monomer, at least one bis(hydrocarbyl)vinyl phosphonate and at least one comonomer such as an alkyl acrylate or a N-methylol acrylamide, blended with antimony oxide are excellent flame retardant additives for flammable materials. The compositions of the present invention show a marked reduction in the after-glow phenomenon associated with compositions containing antimony oxide.

12 Claims, No Drawings

FLAME-RETARDANT BINDER COMPRISING VINYLIDENE HALIDE-BIS(HYDROCARBYL) VINYL PHOSPHONATE POLYMER LATICES BLENDED WITH ANTIMONY OXIDE

BACKGROUND OF THE INVENTION

Copolymers of vinyl halides, vinylidene halides and various phosphorus-containing vinyl monomers have been frequently used as fire retardant agents for various flexible flammable materials, such as paper, cotton fabrics and non-woven compositions. For light weight and flexible materials, there is a limit to how much polymer can be incorporated therein before a soft hand and flexibility are lost. When insufficient polymer is incorporated, the material will not be flame retardant.

TECHNICAL DISCLOSURE OF THE INVENTION

It has now been found that polymer latices comprising at least one halogen-containing $\alpha,\beta$-ethylenically unsaturated monomer, at least one bis(hydrocarbyl)vinyl phosphonate, and at least one third comonomer as hereinafter defined, blended with antimony oxide provide an excellent flame retardant binder for flexible, flammable materials. The latex blend compositions of this invention exhibit a marked reduction in the afterglow phenomenon observed in simple chlorine compound-antimony oxide combinations. Other blending agents, such as chloroparaffins, may be incorporated into the polymer to increase softness.

The polymers usable in connection with this invention are aqueous polymeric latices comprising:

1. at least one halogen-containing, alpha, betaethylenically unsaturated monomer, i.e., vinyl monomers including vinyl halides such as, for example, vinyl chloride, vinyl fluoride and vinyl bromide, halogenated $C_1$–$C_{12}$ alkyl acrylates and methacrylates such as, for example, methyl alpha-chloroacrylate and methyl alpha-bromoacrylate; vinylidene halides such as, for example, vinylidene chloride, vinylidene bromide, vinylidene chlorobromide and vinylidene fluoride; halosubstituted nitriles of ethylenically unsaturated carboxylic acids such as, for example, alpha-chloroacrylonitrile; and the chlorinated styrenes such as, for example alpha-chlorostyrene, o-chlorostyrene, m-chlorostyrene, p-chlorostyrene, and 2,4-dichlorostyrene;

2. at least one bis(hydrocarbyl)vinylphosphonate having the structure:

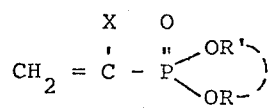

wherein X is selected from the group consisting of hydrogen, halogen, cyano, aryl such as phenyl, $C_1$–$C_{18}$ alkyl and

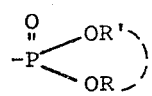

wherein R and R' are hydrocarbyl and substituted hydrocarbyl groups consisting essentially of hydrogen and carbon and containing up to about 18 carbon atoms inclusive with the proviso that R and R' may be the same, different or conjoint, i.e., R and R' may combine to form one single radical; and 3. at least one comonomer including alpha olefins such as ethylene, propylene and butylene; vinyl esters of carboxylic acids, such as vinyl acetate, vinyl butyrate and vinyl stearate; and $C_1$–$C_{20}$ alkyl esters of acrylic and methacrylic acid such as methyl methacrylate, methyl acrylate, ethyl acrylate, n-butyl acrylate, sec.-butyl acrylate, tert.-butyl acrylate, 2-ethylhexyl acrylate, lauryl acrylate and the like; ethylenically unsaturated dicarboxylic acids, their anhydrides and their $C_1$–$C_{20}$ mono- and dialkyl esters such as aconitic acid, fumaric acid, maleic acid, itaconic acid, citraconic acid, maleic anhydride, dibutyl fumarate and monoethyl maleate; amides of ethylenically unsaturated carboxylic acids such as acrylamide and methacrylamide and their N-methylol and diacetone derivatives such as N-methylol acrylamide, N-methylol methacrylamide and diacetone acrylamide; vinyl aryl compounds such as styrene and alpha-methyl styrene; $C_1$–$C_{20}$ alkyl vinyl ethers such as methyl vinyl ether, ethyl vinyl ether and stearyl vinyl ether; dienes such as isoprene and butadiene; and glycidyl esters of acrylic and methacrylic acid such as glycidyl acrylate and glycidyl methacrylate. The preferred comonomers are the $C_1$–$C_{20}$ alkyl esters of acrylic and methacrylic acid especially the lower ($C_4$–$C_8$) alkyl acrylates.

It is considered preferable to additionally include the N-methylol and diacetone derivatives of amides of ethylenically unsaturated carboxylic acids such as, for example, N-methylol acrylamide or diacetone acrylamide which serve to provide the resulting polymer with cross-linking sites.

The use, in this disclosure, of the expression "hydrocarbyl" and "substituted hydrocarbyl groups" in the definition of the suitable bis(hydrocarbyl)vinylphosphonates given hereinabove refers to the radicals obtained upon the removal of a hydrogen from a hydrocarbon or substituted hydrocarbon group which may be either an aliphatic or aromatic group. These hydrocarbyl groups may be substituted with any non-interferring groups, i.e., with any group which does not interfere with the polymerization of the bis-(hydrocarbyl)vinylphosphonate. Such substituent groups include, for example, chloro, bromo, fluoro, nitro, hydroxy, sulfone, ethoxy, methoxy, nitrile, ether, ester and keto groups and the like.

Illustrative of the aliphatic and aromatic groups as are represented by R and R' in the structure of the bis-(hydrocarbyl)vinylphosphonate given hereinabove are alkyl groups, such as methyl, ethyl, propyl, butyl, pentyl, hexyl, nonyl, and the like; alkenyl groups such as pentenyl and hexenyl groups and all of their respective isomers; cycloalkyl groups, such as cyclopropyl, cyclobutyl, cyclopentyl, cyclohexyl and the like; cycloalkenyl groups such as cyclohexenyl and the like; typical aryl groups include phenyl, benzyl, phenethyl, tolyl, naphthyl and the like.

Representative of the above-defined bis(hydrocarbyl)vinylphosphonates are:
Bis(beta-chloroethyl)vinylphosphonate;
Bis(beta-chloropropyl)vinylphosphonate;
Bis(beta-chloroethyl) 1-methylvinylphosphonate;
Bis(beta-chloroethyl) 1-cyanovinylphosphonate;
Bis(beta-chloroethyl) 1-chlorovinylphosphonate;
Bis(beta-chloroethyl) 1-phenylvinylphosphonate;
Dimethyl vinylphosphonate;

Diethyl vinylphosphonate;
Bis(omega-chlorobutyl) vinylphosphonate;
Di-n-butyl vinylphosphonate;
Di-isobutyl vinylphosphonate;
Bis(2-chloroisopropyl) 1-methylvinylphosphonate;
Diphenyl vinylphosphonate; and
Bis(2,3-dibromopropyl)vinylphosphonate From the above group of bis(hydrocarbyl)vinylphosphonate monomers, it is preferred to employ bis(betachloroethyl)vinylphosphonate in preparing the novel aqueous emulsion polymers of this invention since the latter monomer is a commercially available material and lower in cost than any of the other bis(hydrocarbyl)vinylphosphonates.

Although either a vinyl halide or a vinylidene halide monomer are preferably employed as the halogen-containing ethylenically unsaturated monomer in the aqueous emulsion polymers of the present invention, it is considered most preferable to employ vinylidene halide monomers since the vinylidene halide monomers when incorporated into polymers of the present invention impart a soft "hand" to substrates upon which they are coated or within which they are impregnated. The preferred third comonomer for use in the polymers of the present invention is an alkyl acrylate, preferably, the $C_4$–$C_8$ alkyl acrylates such as n-butyl acrylate and 2-ethylhexyl acrylate. Most preferred are polymers containing both a $C_4$–$C_8$ alkyl acrylate and N-methylol acrylamide. It has been found that inclusion in the polymer of an alkyl acrylate aids in imparting good color stability and softness to the resulting polymer. Additionally, inclusion of N-methylol acrylamide or the like renders the resulting polymeric composition self-crosslinkable. It is to be noted, at this point, that the use of the term "polymer" in this disclosure is meant to apply to polymers derived from three or more distinct monomeric species.

In addition to the above-described bis(hydrocarbyl) vinylphosphonates, it is also possible to prepare aqueous emulsion polymers useful as flame retardant additives by employing: (1) mono(alkyl) acid vinylphosphonates such as, for examlpe, mono(ethyl) hydrogen vinylphosphonate, mono(butyl) hydrogen vinylphosphonate, mono(octyl)hydrogen vinylphosphonate; mono(beta-chloroethyl)hydrogen vinylphosphonate, mono(omegachlorooctyl)hydrogen vinylphosphonate; (2) mono(cycloalkyl) and mono(aryl)hydrogen vinylphosphonates such as, for example, mino(cyclohexyl)hydrogen vinylphosphonate, mono(phenyl)hydrogen vinylphosphonate, mono(benzyl)hydrogen vinylphosphonate; (3) bis(cycloalkyl) and bis(aryl)vinylphosphonates, such as, for example, bis(cyclohexyl)vinylphosphonate and bis(benzyl) vinylphosphonates; and, (4) bis(alkyl), bis(cycloalkyl), and bis(aryl) allylphosphonates, such as, for example bis(betachloroethyl)allylphosphonate, bis(cyclohexyl) allylphosphonate and bis(benzyl)allylphosphonate as well as mixtures of any two or more of the above described phosphonate monomers.

The polymeric latex compositions usable in connection with the present invention can be prepared by means of free radical initiated emulsion polymerization techniques well known to those skilled in the art. In these procedures, the various monomers and catalysts are emulsified, in water, by means of one or more surface-active emulsifiers whereupon the polymerization reaction is then initiated. Suitable water soluble, free radical initiating catalysts for use in preparing the copolymer latices of this invention include sodium, potassium and ammonium persulfate and hydrogen peroxide or one may use a redox system such, for example, as a mixture of a persulfate with an alkali metal bisulfite, thiosulfate or hydrosulfite. These catalysts should be present in a concentration of from about 0.05 to 5.0%, by weight, of the total monomer charge. With respect to the emulsifier or surfactant, it is possible to utilize one or more anionic, cationic, or non-ionic emulsifiers such, for example, as the alkyl carboxylic acid salts; the alkyl sulfate, sulfonate, phosphate, or sulfosuccinate salts; the alkyl aryl ether alcohols, and the alkyl aryl polyether sulfate salts. The selected emulsifier or emulsifiers should be present in effective concentration of from about 0.03 to 6.0%, by weight, of the total monomer charge. In addition, a protective colloid such as polyvinyl alcohol, polyvinyl pyrrolidone, methyl cellulose or gelatin can also, if desired, be present in the recipe in an effective concentration of from about 0.03 to 6.0%, by weight, of the total monomer charge. Alternatively, the protective colloid may be introduced into the polymer latex subsequent to its preparation. When post added in this manner, the protective colloid should be present in a concentration of from about 0.03 to 6.0%, by weight, of the total resin solids. In any event, the presence of the protective colloid serves to enhance the mechanical stability of the emulsion.

The actual polymerization reaction will ordinarily be conducted at a temperature of from about 0° to to 100°C. for a period of from about 1 to 24 hours, depending upon such factors as the particular monomer, catalysts, surfactants and polymerization apparatus that is being utilized. The latices resulting from this polymerization process will ordinarily have a resin solids content of from about 5 to 70%, by weight, wherein the particles have a diameter which ranges in size from about 0.03 to 3.0 microns.

With respect to proportions, these aqueous emulsion or latex polymer particles may contain from about 1 to 89% by weight, of one or more of the above described bis(hydrocarbyl)vinylphosphonates, from about 10 to 98% by weight of one or more of the above-described halogen-containing ethylenically unsaturated monomers and from about 1 to 45% by weight of one or more of the above-described third comonomers. Optimum results, as flame retardant additives imparting good color stability to a wide variety of flexible, flammable materials and adapted to impart good "hand" to said materials are obtained by use of polymers in accordance with the present invention containing from about 10 to 75% by weight of one or more of the bis(hydrocarbyl)vinyl phosphonates, from about 20 to 85% by weight of one or more of the above-described halogen-containing ethylenically unsaturated monomers and from about 5 to 35% of one or more of the above-described third comonomers. Most preferred, is a polymer containing about 45–55%, by weight of bis(beta-chloroethyl)vinyl phosphonate, 25–35% by weight of vinylidene chloride, 14–20% by weight of n-butyl acrylate and 1–5% by weight of N-methylol acrylamide. n-Butyl acrylate can be replaced without affecting the properties of the latex polymer, by 2-ethyl hexyl acrylate. When 2-ethylhexyl acrylate is used, the most preferred composition contains 65–75% by weight of vinylidene, chloride, 12–22 % by weight bis(beta-chloroethyl)vinyl phosphonate, 5–13% by weight of 2-ethylhexyl acrylate and 1–5% by weight of N-methylol acrylamide.

With respect to the above-described proportions for the composition of the aqueous emulsion or latex polymers of this invention, it has been found that it becomes increasingly more difficult to attain good polymerization conversion rates as attempts are made to increase the amount of the bis(hydrocarbyl)vinyl phosphonate in the resulting polymer substantially above a concentration of about 60% by weight. On the other hand, the use of these polymer emulsions as flame retardant additives becomes progressively more inefficient when they contain substantially less than about 5% by weight of one or more bis(hydrocarbyl)vinyl phosphonates, since a rather high concentration of the polymer will then be required in order to attain flame retardancy. At concentrations of one or more bis(hydrocarbyl)vinyl phosphonates substantially less than about 5% by weight of the polymer emulsion, the composition becomes less effective in preventing after-glow phenomenon. The use of high concentrations of these polymer additives may, in turn, result in some deterioration in the inherent physical properties of the thus modified composition or material.

Illustrative of the flexible, flammable materials which can be made flame retardant in accordance with the present invention are cellulosic materials in the form of non-woven fabrics, woven textiles or even paper.

The cellulosic materials treated by the compositions of this invention include cellulose, rayon, cellulose esters and mixed esters such as, for example, cellulose nitrate, cellulose acetate, cellulose acetate-butyrate, cellulose acetate-propionate, and cellulose ethers such as, for example, ethyl cellulose. The cellulosic materials can be the sole substrate or they can be blended with other materials such as polyesters, polyamides, polyacrylonitriles, polyvinyl alcohol.

The compositions of this invention are prepared by admixing the above-described polymeric latex composition with antimony oxide. If desired, chloroparaffins can also be added to the resultant composition in order to improve the softness of the binder. With respect to proportions, the binder composition may contain from about 30 to about 95% by weight of polymer (figured on a dry basis, although incorporated as a latex) and from about 5 to about 25% by weight of $Sb_2O_3$. Chloroparaffins can be included in amounts ranging from about 0 to about 45% by weight of the binder composition. Preferred ranges are from 50 to 95% by weight of polymer and from 5 to 25% by weight of $Sb_2O_3$.

The fire retardant polymer compositions of this invention can be prepared so as to contain various optional additives which may include plasticizers such as the alkyl esters of phthalic, adipic and sebacic acids such, for example, as dioctyl phthalate and ditridecyl phthalate and aryl phosphate esters such, for example, as triphenyl and tricresyl phosphate. etc.; lubricants and mold release agents such as stearic acid or its metal salts, petroleum based waxes, mineral oils and their halogenated products, polyethylene waxes and their halogenated products, etc; and heat and light stabilizers such as barium, cadmium, calcium, zinc soaps or phenates, basic lead compounds, organo-tin compounds, such as dialkyl tin mercaptides and dialkyl tin maleates, thiolauric anhydride and n-butyl stannoic acid, epoxidized oils, alkyl diphenyl phosphites, triaryl phosphites, phenyl salicylates, o-hydroxy benzophenones and benzotriazoles, etc. For a more complete listing of plasticizers, lubricants, stabilizers and other functional additives, one may consult "Polyvinyl Chloride" by H. A. Sarvetnick published by Van Nostrand Reinhold Co., New York, N.Y., in 1969.

The compositions of this invention may also contain fillers, pigments, dyes, opacifying agents, decorative additives such as reflective metal foils or flakes, and other imbedded solid objects such as fiber glass, textile fibers, asbestos, and the like, provided that they do not detract from the flame retardancy of these products.

The binder compositions are applied to the flexible, flammable, cellulosic materials by methods well known in the art, such as, for example, by immersion in a bath containing the binder, or by knife-coating.

The practice of this invention is shown by the following examples, which are included here for purposes of illustration only and are not intended as limitations. Unless otherwise specified, all percentages and parts are by weight.

EXAMPLE 1

A pad bath is prepared with the following composition on a 100% dry basis.

| | |
|---|---|
| 57% - | polymer(19.2% bis(beta-chloroethyl)vinylphosphonate/66.6% vinylidene chloride/9.6% 2-ethyl hexyl acrylate/4.6% N-methylol acrylamide, as a 50% latex) |
| 29% - | Chlorowax(Rezo Sperse - 3 as a 66.5% active emulsion) |
| 14% - | $Sb_2O_3$ |

The mixture is stirred to insure uniformity. Samples of 1½ oz./square yard commercial non-woven cellulosic cloth are then immersed in the bath, squeezing out the excess liquid and then drying the samples at 60°C. for 2 hours in a forced air oven. The dried samples were then burned via AATCC method 34–1966.

| % Add On | Char Length after Burning Test | |
|---|---|---|
| 50 | < 5" | (Non-Burning) |
| 40 | 6¾" | (Non-Burning) |
| 30 | 8" | (Self-Extinguishing) |
| 25 | 11" | (Self-Extinguishing) |
| 20 | >12" | (BURNING) |
| 0 | Burned entire length | (BURNING) |

Non-burning and self-extinguishing samples showed no after-glow which is generally observed only on cottons treated solely with halogen compounds and $Sb_2O_3$.

What is claimed is:

1. A flame retardant polymer latex comprising: (1) from about 30% to 95% by weight of a polymer consisting essentially of from about 10% to 98% by weight of at least one halogen-containing $\alpha$, $\beta$-ethylenically unsaturated vinyl monomer selected from the group consisting of the vinyl and vinylidene halides, the halogenated $C_1$–$C_{12}$ alkyl acrylates and methacrylates, the halosubstituted nitriles of ethylenically unsaturated carboxylic acids, and the chlorinated styrenes; from about 1% to 89% by weight of at least one bis(hydrocarbyl)-vinylphosphonate of the formula:

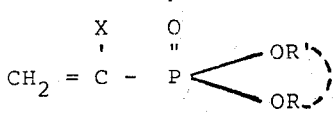

in which X is selected from the group consisting of hydrogen, halogen, cyano, phenyl, alkyl of from one to 18 carbon atoms and the grouping

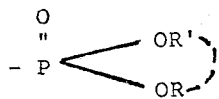

wherein each R and R' are hydrocarbyl of from one to 18 carbon atoms; and from about 1% to 45% by weight a $C_1$–$C_{20}$ alkyl ester of acrylic and methacrylic acid; and (2) from about 5% to about 25% by weight of antimony oxide.

2. A composition according to claim 1 wherein the bis(hydrocarbyl)vinylphosphonate is bis(beta-chloroethyl) vinylphosphonate.

3. A composition according to claim 2 wherein the halogen-containing $\alpha,\beta$-ethylenically unsaturated monomer is vinylidene chloride.

4. A composition according to claim 1 wherein the third comonomer is 2-ethylhexyl acrylate.

5. A composition according to claim 1 wherein the third comonomer is n-butyl acrylate.

6. A composition according to claim 1 additionally containing N-methylol acrylamide.

7. A composition as claimed in claim 1 which comprises about 50% to 95% by weight of the polymer.

8. A composition as claimed in claim 1 wherein the polymer comprises about 10–75% by weight of the bis-(hydrocarbyl)vinylphosphonate.

9. A composition as claimed in claim 1 wherein the polymer comprises about 20% to 85% by weight of the halogen-containing $\alpha,\beta$-ethylenically unsaturated vinyl monomer.

10. A composition as claimed in claim 1 wherein the polymer comprises about 5% to 35% by weight of the $C_1$–$C_{20}$ alkyl ester of acrylic or methacrylic acid.

11. A composition as claimed in claim 6 wherein the polymer comprises about 45% to 55% by weight of bis-(beta-chloroethyl)vinylphosphonate, 25% to 35% by weight of vinylidene chloride, 14% to 20% of n-butyl acrylate, and 1% to 5% by weight of N-methylol acrylamide.

12. A composition as claimed in claim 6 wherein the polymer comprises 65% to 75% by weight of vinylidene chloride, 12% to 22% by weight of bis(beta-chloroethyl)vinylphosphonate, 5% to 13% by weight of 2-ethylhexyl acrylate and 1% to 5% by weight of N-methylol acrylamide.

* * * * *